(12) United States Patent
Kamikubo

(10) Patent No.: US 6,342,964 B2
(45) Date of Patent: Jan. 29, 2002

(54) SCANNING OPTICAL SYSTEM

(75) Inventor: Junji Kamikubo, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/758,178

(22) Filed: Jan. 12, 2001

(30) Foreign Application Priority Data

Jan. 14, 2000 (JP) .......................................... 12-005448
May 9, 2000 (JP) .......................................... 12-135454

(51) Int. Cl.⁷ ............................................. G02B 26/08
(52) U.S. Cl. ..................... 359/205; 359/216; 359/566
(58) Field of Search ................................ 359/205, 206, 359/207, 212, 216, 217, 218, 219, 566; 347/256, 258, 259

(56) References Cited

U.S. PATENT DOCUMENTS

| | | | |
|---|---|---|---|
| 5,189,546 A | 2/1993 | Iizuka | 359/217 |
| 5,963,355 A | 10/1999 | Iizuka | 359/205 |
| 6,038,053 A | * 3/2000 | Kato | 359/205 |
| 6,115,164 A | 9/2000 | Kamikubo | 359/196 |
| 6,124,962 A | 9/2000 | Kamikubo | 359/205 |
| 6,208,450 B1 | * 3/2001 | Toyoda | 359/205 |

FOREIGN PATENT DOCUMENTS

JP    11-95145    4/1999

\* cited by examiner

*Primary Examiner*—Darren Schuberg
(74) *Attorney, Agent, or Firm*—Greenblum & Bernstein, P.L.C.

(57) ABSTRACT

A scanning optical system includes a semiconductor laser, a polygonal mirror, which deflects a beam emitted from the semiconductor laser, an fθ lens for converging the deflected beam onto an object surface, and a diffractive element located between the polygonal mirror and the fθ lens. The diffractive element corrects a lateral chromatic aberration caused by the fθ lens. The diffractive element is inclined such that the light source side edge of thereof is close to the polygon mirror and the other side edge is apart form the polygon mirror relative to the reference condition where the normal of the diffractive element is parallel to the optical axis of the fθ lens. Further, the diffractive element is arranged such that a reference point, which is the center of the rotationally symmetrical diffractive surface, deviates from the optical axis of the fθ lens in the direction away from the semiconductor laser.

14 Claims, 8 Drawing Sheets

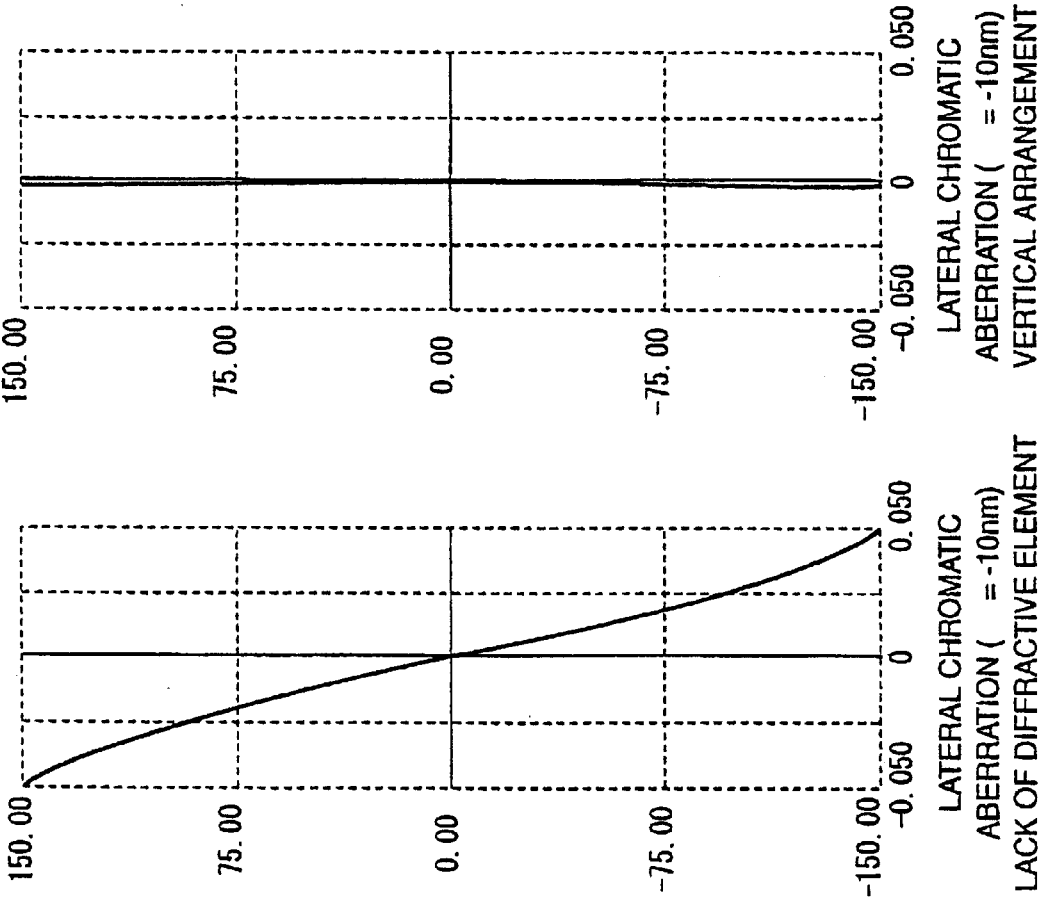

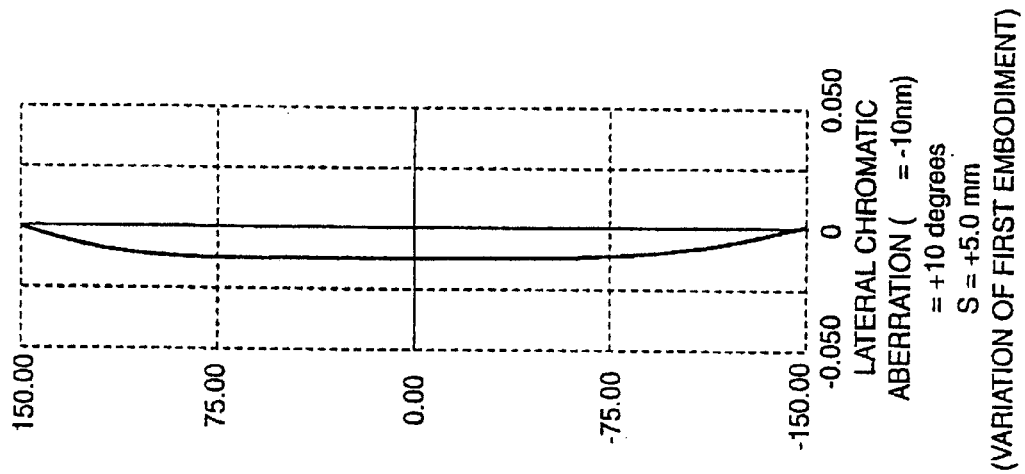
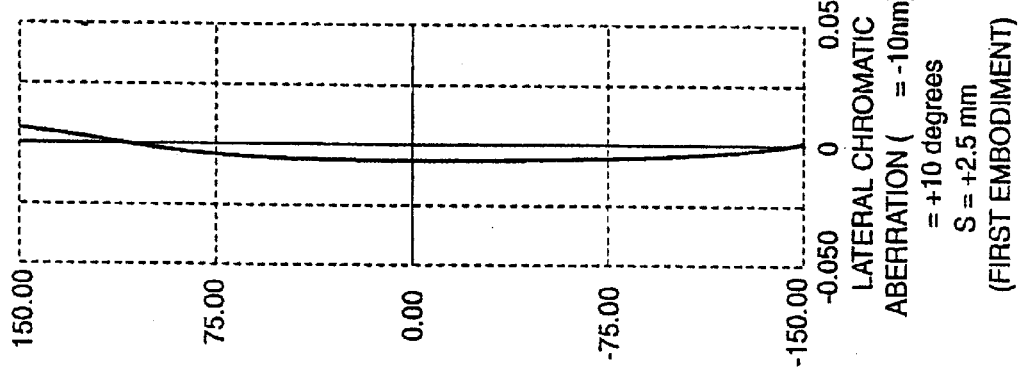

SCANNING OPTICAL SYSTEM

BACKGROUND OF THE INVENTION

The present invention relates to a scanning optical system that is used as an optical system for a scanning optical device such as a laser beam printer.

The scanning optical device deflects a beam emitted from a light source such as a semiconductor laser by means of, for example, a polygonal mirror, and converges the beam to form a beam spot on an object surface to be scanned such as a surface of a photoconductive drum, through an fθ lens (i.e., a scanning lens). The beam spot formed on the object surface moves (i.e., scans) on the object surface in a predetermined scanning direction as the polygonal mirror rotates.

In this specification, a scanning direction of the beam spot on the object surface is referred to as a "main scanning direction", a direction perpendicular to the main scanning direction on the object surface is referred to as an "auxiliary scanning direction". Shapes and orientations of powers of respective optical elements will be defined on the basis of these scanning directions. Further a plane in which the optical axis of the scanning lens is located and is perpendicular to the rotation axis of the deflector is referred to as a "main scanning plane".

In such a scanning optical system, lateral chromatic aberration should be corrected to reduce a variation of printing performance among the systems due to an individual difference of a emission wavelength of a semiconductor laser. Further, the correction of the lateral chromatic aberration is absolutely necessary for a multi-beam scanning optical system, which employs a plurality of laser sources to form a plurality of scanning lines per one scan, in order to compensate for a variation of emission wavelength among laser sources of the system.

Conventionally, the chromatic aberration of the fθ lens is corrected by combining a positive lens and a negative lens having different dispersion. In order to correct the chromatic aberration of the fθ lens by selecting lens materials (glass materials) having different dispersion as in the prior art described above, the number of lens elements of the fθ lens increases as compared with a case where the chromatic aberration is not corrected. In addition, in order to correct the chromatic aberration, lens materials cannot be selected only by their refractive indexes, and types of available lens materials are limited, thereby degree of freedom in designing the lens is lowered.

It is also known as a prior art that lateral chromatic aberration is corrected by means of a combination of a refractive lens and a diffractive element. For example, Japanese Patent Provisional Publication No. Hei 11-095145 discloses a scanning optical system that employs the diffractive element located between a polygon mirror and an fθ lens to correct the lateral chromatic aberration caused by the fθ lens. Further, the publication indicates that the diffractive element doubles as a cover glass of a noise reduction cover for the polygon mirror.

When a center axis of the laser beam incident on the polygon mirror and the optical axis of the fθ lens are located in the same plane and cross each other at a predetermined angle, the noise reduction cover must allow to pass both of the incident laser beam onto the polygon mirror and the reflected laser beam from the polygon mirror at different areas.

However, since the diffractive element disclosed in the Publication is arranged to be perpendicular to the optical axis of the fθ lens, another cover glass through which the incident beam onto the polygon mirror passes is required in addition to the diffractive element that doubles as the cover glass through which the reflected beam from the polygon mirror passes. Further, unnecessary light reflected by the diffractive element tends to be incident on the object surface as ghost light.

On the other hand, when the diffractive element is inclined with respect to the optical axis of the fθ lens, the diffractive element allows to pass the incident laser beam onto the polygon mirror and the reflected laser beam from the polygon mirror. That is, the other cover glass in addition to the diffractive element is unnecessary. However, in this case, the lateral chromatic aberration becomes larger relative to the case where the diffractive element is perpendicular to the optical axis.

SUMMARY OF THE INVENTION

It is therefore an object of the invention to provide an improved scanning optical system that is capable of reducing the lateral chromatic aberration when the diffractive element is inclined with respect to the optical axis of a scanning lens.

For the above object, according to a first aspect of the invention, there is provided a scanning optical system, including a light source; a deflector, which deflects a beam emitted from the light source; a scanning lens having positive refractive power for converging the beam deflected by the deflector onto an object surface to be scanned; and a diffractive element, which is located between the deflector and the object surface, for correcting chromatic aberration caused by the refractive power of the scanning lens. The diffractive element employs a diffractive surface that is formed to be symmetrical with respect to a predetermined reference point in the main scanning direction. The diffractive element is arranged such that the normal of the diffractive surface at the reference point is inclined with respect to the optical axis of the scanning lens in the main scanning direction and that the reference point deviates from the optical axis in the main scanning direction.

With this construction, the variation of the lateral chromatic aberration is averaged, which can lower the maximum value thereof even if the diffractive element is inclined with respect to the optical axis of the scanning lens.

The diffractive element may be a flat plate in macroscopic view having almost no power in proximity to the reference point. Further, the diffractive element may be located between the deflector and the scanning lens. In such a case, one edge of the diffractive element is close to the deflector and the other edge is apart from the deflector in the main scanning direction relative to a reference condition where the normal of the diffractive surface at the reference point is parallel to the optical axis of the scanning lens. Further, the reference point should deviate from the optical axis toward the edge that is apart from the deflector.

When the center axis of the laser beam incident on the deflector and the optical axis of the scanning lens are located in the main scanning plane and cross each other at a predetermined angle, the laser beam is incident on the deflector from outside the scanning area on one side of the optical axis of the scanning lens. In this case, when the diffractive element is inclined such that the light source side edge thereof is close to the deflector, the reference point should deviate from the optical axis in the direction away from the light source. On the contrary, when the diffractive element is inclined such that the light source side edge thereof is apart from the deflector, the reference point should deviate from the optical axis in the direction nearer to the light source.

Assuming that an inclination angle θ (unit: degree) of the normal of the diffractive surface with respect to the optical axis has a positive value when the diffractive element is inclined such that the light source side edge thereof is close to the deflector, the following condition (1) is preferably satisfied when θ≧0, and the condition (2) is preferably satisfied when θ<0;

(1) $0 < S < 0.7 \times |\theta|$ (2) $-0.7 \times |\theta| < S < 0$ where S (unit: mm) is a deviation amount of the reference point with respect to the optical axis of the scanning lens and has a positive value when the reference point deviates in the direction away from the light source.

According to a second aspect of the invention, there is provided a scanning optical system, including a light source; a deflector; a scanning lens; and a diffractive element, which is located between the deflector and the object surface, having a diffractive surface to correct chromatic aberration caused by the refractive power of the scanning lens. The diffractive element is arranged such that the normal of the diffractive surface at an intersection point with the optical axis of the scanning lens is inclined with respect to the optical axis in the main scanning direction. Further, an additional optical path length added by the diffractive surface asymmetrically varies with the distance from the optical axis in the main scanning direction and the additional optical path length has the minimum value at the intersection point.

With this construction, at least a part of an asymmetry of the lateral chromatic aberration caused when the diffractive element is inclined with respect to the optical axis of the scanning lens can be counterbalanced with the asymmetrical variation of the additional optical path length added by the diffractive surface, which can reduce the lateral chromatic aberration.

The diffractive element may be a flat plate in macroscopic view having almost no power in proximity to the intersection point.

The additional optical path length added by the diffractive surface is expressed by the following optical path difference function Φ(Y):

$$\Phi(Y) = P_1 Y + P_2 Y^2 + P_3 Y^3 + P_4 Y^4 + P_5 Y^5 + P_6 Y^6 + \ldots$$

where $P_n$ are coefficients of n-th order, Y is a distance from the optical axis in the main scanning direction and λ is wavelength. When the center axis of the laser beam incident on the deflector and the optical axis of the scanning lens are located in the main scanning plane and cross each other at a predetermined angle, the first order coefficient $P_1$ satisfies the condition (3) when the diffractive element is inclined such that the light source side edge thereof is close to the deflector, or satisfies the condition (4) when the diffractive element is inclined such that the light source side edge thereof is apart from the deflector.

(3) $P_1 \geq 0$ (4) $P_1 < 0$

The macroscopic shape of the diffractive surface may be an anamorphic surface whose rotation axis is parallel to the main scanning direction.

BRIEF DESCRIPTION OF THE DRAWINGS

FIG. 5A is a graph showing lateral chromatic aberration when the diffractive element is not provided;

FIG. 5B is a graph showing lateral chromatic aberration when the diffractive element is arranged as shown in FIG. 4A;

FIG. 5C is a graph showing lateral chromatic aberration when the diffractive element is arranged as shown in FIG. 4B;

FIG. 6A is a graph showing lateral chromatic aberration when the diffractive element is arranged as shown in FIG. 4C when the deviation amount is +2.5 mm;

FIG. 6B is a graph showing lateral chromatic aberration when the diffractive element is arranged as shown in FIG. 4C when the deviation amount is +5.0 mm;

DETAILED DESCRIPTION OF THE PREFERRED EMBODIMENTS

Scanning optical systems embodying the invention will be described with reference to the accompanying drawings. The scanning optical system of each embodiment is adapted to be used in a laser scanning unit of a laser beam printer. The scanning optical system scans a laser beam modulated by an input signal onto an object surface to be scanned such as a photoconductive drum to form a latent image thereon.

First Embodiment

Figure 1:
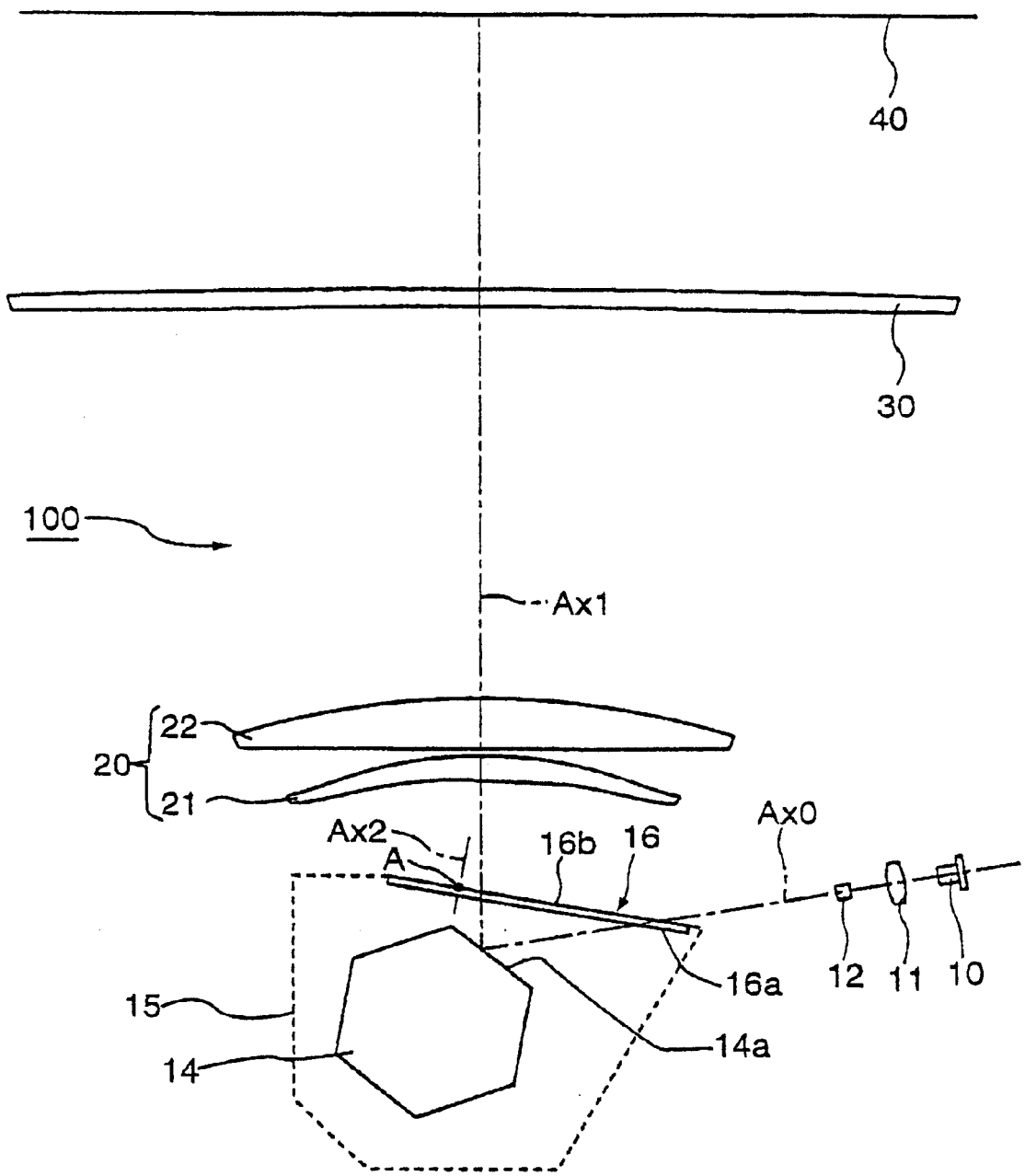
FIG. 1 is a diagram showing an arrangement of optical elements of a scanning optical system, viewed in the main scanning plane, according to a first embodiment.

FIG. 1 is a diagram illustrating a basic construction of a scanning optical system 100 according to the first embodiment, viewed in the main scanning plane.

A divergent laser beam emitted by a semiconductor laser (light source) 10 is collimated by a collimator lens 11 and is converged in the auxiliary scanning direction by a cylindrical lens 12 to be incident on a polygonal mirror (deflector) 14. The laser beam deflected by a reflection surface 14a of the polygonal mirror 14 forms a beam spot on an object surface 40 to be scanned through a diffractive element 16, of fθ lens 20 as a scanning lens and a compensation lens 30.

One surface of the cylindrical lens 12 at the side of the collimator lens is formed as a cylindrical surface, the other surface at the side of the polygon mirror 14 is a flat surface. The power of the cylindrical lens 12 is determined such that a line-spread image is formed in the proximity to the reflection surface 14a.

A noise reduction cover 15 is attached surrounding the polygon mirror 14 as shown by a dotted line in FIG. 1. The diffractive element 16 doubles as a cover glass of the noise reduction cover 15. A first surface 16a of the diffractive element 16 at the side of the polygon mirror 14 is a flat surface and the diffractive surface is formed on a part of a second surface 16b at the side of the fθ lens 20. The diffractive surface is formed to be rotationally symmetrical with respect to a predetermined reference point A to correct chromatic aberration caused by the refractive power of the fθ lens 20.

In the optical system of the first embodiment, since the center axis Ax0 of the laser beam incident on the polygon mirror 14 and the optical axis Ax1 of the fθ lens 20 are located in the main scanning plane and cross each other at a predetermined angle, the noise reduction cover 15 must allow to pass both of the incident laser beam onto the polygon mirror 14 and the reflected laser beam from the polygon mirror 14 at different areas.

The diffractive element 16 is arranged such that the normal Ax2 of the diffractive element 16 at the reference point A is inclined with respect to the optical axis Ax1 of the fθ lens 20 in a clockwise direction in FIG. 1 relative to a reference condition where the normal Ax2 is parallel to the optical axis Ax1. That is, the diffractive element 16 is inclined such that the light source side edge of the diffractive element 16 is close to the polygon mirror 14 and the other side edge is apart from the polygon mirror relative to the reference condition. With such an arrangement of the diffractive element 16, the diffractive element 16 allows to pass both of the incident laser beam onto the polygon mirror 14 and the reflected laser beam from the polygon mirror 14. Further, the diffractive element 16 is arranged such that the reference point A deviates from the optical axis Ax1 in the direction away from the semiconductor laser 10 (toward the left side in FIG. 1).

The laser beam reflected from the polygon mirror 14 is incident on the fθ lens 20 as a parallel beam in the main scanning direction and as a divergent beam in the auxiliary scanning direction. The fθ lens 20 consists of a first lens 21 and a second lens 22 arranged in this order along the direction from the polygonal mirror 14 to the object surface 40. All of the lens surfaces of the first and second lenses 21 and 22 are rotationally symmetrical surface about the optical axis Ax1. The fθ lens 20 has a positive resultant power as a whole.

The compensation lens 30 is located near the object surface 40 and has a large positive power in the auxiliary scanning direction to compensate for curvature of field. One surface of the compensation lens 30 at the side of the fθ lens 20 is an anamorphic surface whose effective refractive power in the auxiliary scanning direction decreases with a distance from the center in the main scanning direction. The laser beam passing through the compensation lens 30 becomes a convergent beam in both of the main and auxiliary scanning directions, and forms a beam spot on the object surface 40.

Figure 2:
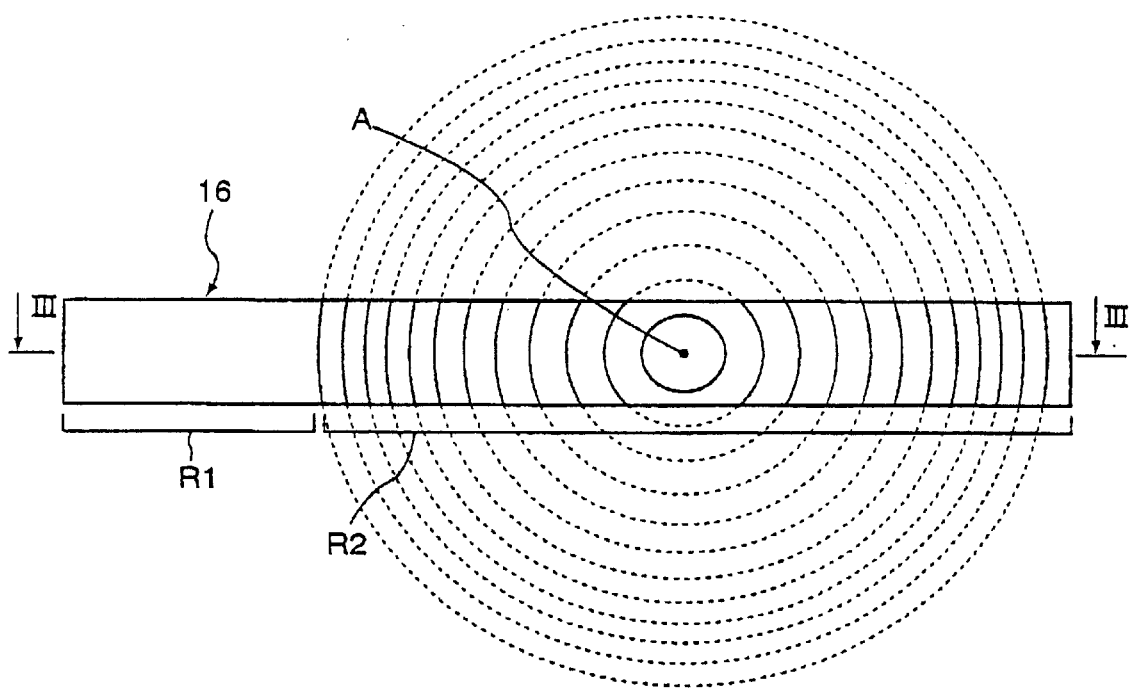
FIG. 2 is a front view of a diffractive element employed in the optical system of FIG. 1.

Next, the shape and the arrangement of the diffractive element 16 will be described with reference to FIGS. 2 through 4. FIG. 2 is a front view of the diffractive element 16 viewed from the side of the fθ lens 20, FIG. 3 is a sectional view of the diffractive element 16 along III—III line, and FIGS. 4A through 4C show arrangements of the diffractive element 16.

Figure 3:
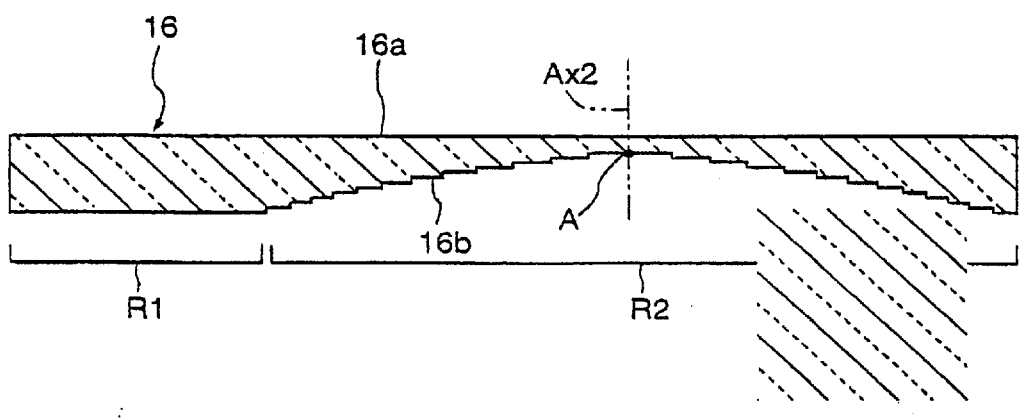
FIG. 3 is a sectional view of the diffractive element of FIG. 2 along III—III line.

The diffractive element 16 is divided into a non-diffractive area R1 and a diffractive area R2, as shown in FIGS. 2 and 3. The laser beam incident on the polygon mirror 14 passes through the non-diffractive area R1 and the laser beam reflected by the polygon mirror 14 passes through the diffractive area R2. The first surface 16a is a continuous surface without steps and is almost flat. The second surface 16b is formed as a flat surface within the non-diffractive area R1 and as the diffractive surface within the diffractive area R2.

The diffractive surface is symmetrical with respect to the reference point A in the main scanning direction. In the first embodiment, the diffractive surface is formed as a part of a plurality of concentric ring areas as shown in FIG. 2, and minute steps are formed at the boundaries between the adjacent ring areas as shown in FIG. 3. That is, the diffractive surface is formed to be rotationally symmetrical about the reference point A.

It should be noted that the number of ring areas is smaller than the actual number and the minute steps are exaggerated for purposes of illustration in FIGS. 2 through 4. The surface of each ring area is a flat surface that is perpendicular to the normal Ax2 at the reference point A as shown in FIG. 3. The ring areas are formed like a staircase in the section. The circular area including the reference point A is the thinnest area and the thickness increases step by step with the distance from the reference point A. Therefore, the diffractive surface is a concave surface in a macroscopic view. Further, the diffractive element 16 is a flat plate in a macroscopic view and has almost no power in proximity to the reference point A.

Figure 4A:
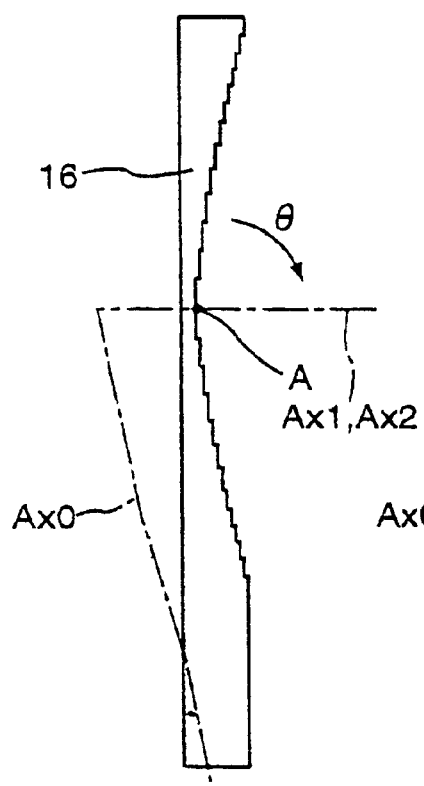
FIG. 4A shows an arrangement of the diffractive element when the normal of the element is parallel to the optical axis of a scanning lens, which is equivalent to the conventional arrangement.
Figure 4B:
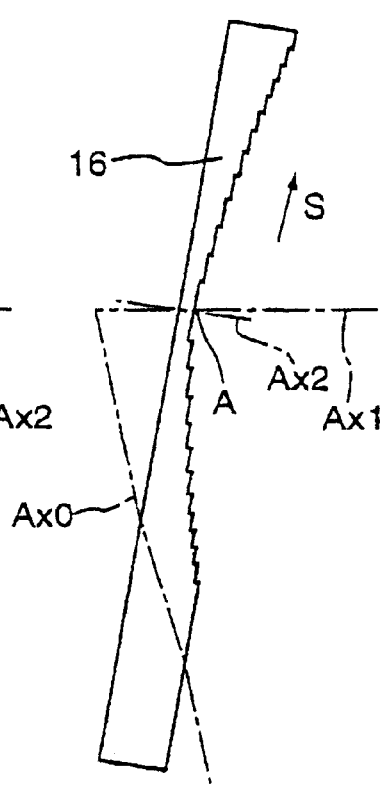
FIG. 4B shows an arrangement of the diffractive element when the diffractive element is inclined relative to the arrangement of FIG. 4A.
Figure 4C:
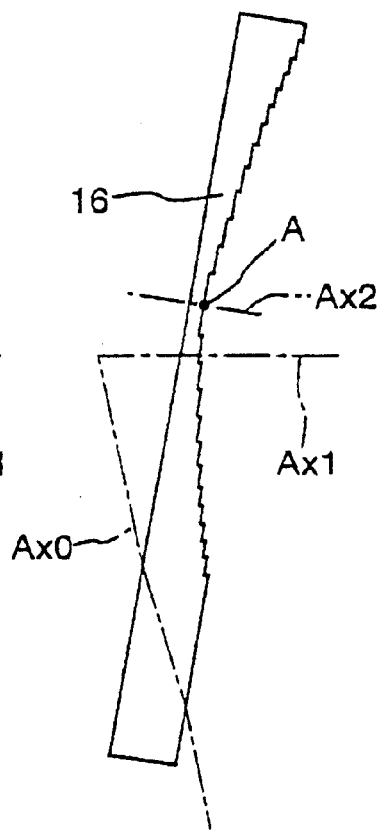
FIG. 4C shows an arrangement of the diffractive element when the reference point deviates relative to the arrangement of FIG. 4B, which is arrangement of the first embodiment.

The diffractive element 16 of the first embodiment is arranged as shown in FIG. 4C. FIG. 4A shows the reference condition where the normal Ax2 at the reference point A is coincident with the optical axis Ax1. In this arrangement, the diffractive element 16 corrects the lateral chromatic aberration caused by the fθ lens 20. However, another cover glass through which the incident beam onto the polygon mirror 14 passes is required in addition to the diffractive element 16. Further, unnecessary light reflected by the diffractive element 16 tends to be incident on the object surface 40 as ghost light.

FIG. 4B shows an arrangement of the diffractive element 16 when the diffractive element 16 is inclined by an angle θ in the clockwise direction relative to the arrangement of FIG. 4A. The arrangement of FIG. 4B allows the diffractive element 16 to pass both of the incident laser beam onto the polygon mirror 14 and the reflected laser beam from the polygon mirror 14. However, since the one edge of the diffractive element 16 at the lower side in FIG. 4B is close to the polygon mirror 14 and the other edge at the upper side in FIG. 4B is apart from the polygon mirror 14 relative to the reference condition of FIG. 4A, a distance from the reference point A to the incident point on the diffractive element 16 of the reflected laser beam at a predetermined deflection angle becomes longer in the upper side of the optical axis Ax1 and becomes shorter in the lower side of the optical axis Ax1 as compared with the arrangement of FIG. 4A. Since the correction effect in the lateral chromatic aberration of the diffractive element 16 becomes larger with the distance from the reference point A, the lateral chromatic aberration is overcorrected in the upper side of the optical axis Ax1 and is undercorrected in the lower side of the optical axis Ax1.

FIG. 4C shows an arrangement of the diffractive element 16 when the diffractive element 16 is shifted by a distance S in the upper direction relative to the arrangement of FIG. 4B. This deviates the reference point A from the optical axis Ax1 in the direction of the edge that is apart from the polygon mirror 14, i.e., in the upper direction as shown in FIG. 4C. Because of the deviation of the reference point A, the value of the lateral chromatic aberration at each image height is averaged, which can lower the maximum value of position error of the beam spot on the object surface 40 when the wavelength of the laser beam is different from a design wavelength.

Assuming that the inclination angle θ (unit: degree) of the normal Ax2 with respect to the optical axis Ax1 has a positive value when the diffractive element 16 is inclined such that the light source side edge thereof is close to the polygon mirror 14, the following condition (1) should be satisfied when θ≧0 as shown in FIG. 4C;

(1) 0<S<0.7×|θ| where S (unit: mm) is the deviation amount of the reference point A with respect to the optical axis Ax1 and has a positive value when the reference point A deviates in the direction away from the semiconductor laser 10.

On the other hand, when the diffractive element 16 is inclined such that the light source side edge thereof is apart from the polygon mirror 14, θ<0, the following condition (2) should be satisfied;

(2) −0.7×|θ|<S<0

When θ<0, while the diffractive element 16 cannot double as the cover glass for the incident laser beam onto the polygon mirror 14, the ghost light can be reduced.

Next, the numerical construction of the first embodiment and the aberrations in the respective arrangements shown in FIGS. 4A and 4C will be described.

Before the description of the numerical construction, a form of expression of the diffractive surface will be defined.

The shape of the diffractive surface is expressed by a distribution of sag amount SAG(h) as the following equation (i). It represents a distance from a tangential plane at the reference point A to the diffractive surface where the height (i.e., distance) from the reference point A is h.

$$SAG(h)d=X(h)+S(h)$$

In the equation (i), X(h) represents a distribution of sag amount of a rotationally symmetrical aspherical surface as a base curve of the diffractive surface, and S(h) represents a distribution of sag amount of the diffractive structure formed on the base curve. The base curve is defined as a shape of the diffractive surface that does not include the diffractive structure. The sags X(h) is expressed by the following equation (ii);

$$(ii) \quad X(h) = \frac{h^2}{r\left\{1+\sqrt{1-\frac{(K+1)^2 h^2}{r^2}}\right\}} +$$

-continued
$$A_4 h^2 + A_6 h^6 + A_8 h^8 + A_{10} h^{10}$$

Symbol r is a radius of curvature at the reference point A, K is a conic constant, A4, A6, A8 and A10 are aspherical surface coefficients of fourth, sixth, eighth and tenth orders.

On the other hand, the optical function of the diffractive surface is expressed by the optical path difference function Φ(h) that is defined by the following equation (iii);

$$(iii) \Phi(h)=P_2 h^2+P_4 h^4+P_6 h^6+P_8 h^8+P_{10} h^{10}$$

where $P_2$, $P_4$, $P_6$, $P_8$ and $P_{10}$ are coefficients of second, fourth, sixth, eighth and tenth orders and λ is wavelength.

S(h) in the equation (i) is defined by use of the function Φ(h) as an equation (iv);

$$S(h) = \frac{\{|MOD(\Phi(h)+C,-1)|-C\}\lambda}{n-1} \quad (iv)$$

where C is a constant defining a phase at a boundary between adjacent rings (0=C<1), n is a refractive index of the diffractive element 16. The function MOD(x, y) represents the remainder when x is divided by y. MOD(Φ(h)+C, −1) equals zero at the boundary between the adjacent rings. In the embodiments, the constant C is equal to 0.5.

A number of the concentric ring N is expressed by the following equation (v).

$$(v) N=INT|\Phi(h)+C|$$

The total shape SAG(h) is obtained by applying the shape of the diffractive structure S(h) onto the shape of the base curve X(h).

The following TABLE 1 shows the numerical construction of the scanning optical system 100 according to the first embodiment on the object surface 40 side with respect to the cylindrical lens 12.

Symbol f in the table represents a focal length of the system 100 in the main scanning direction, W is a width of an effective scanning range on the object surface 40, ω is a scan angle that is the angle formed between the laser beams directed to the both edge of the scanning range, ry is a radius of curvature (unit: mm) of a surface in the main scanning direction, rz denotes a radius of curvature (unit: mm) of a surface in the auxiliary scanning direction (which will be omitted if a surface is a rotationally-symmetrical surface), d is a distance (unit: mm) between surfaces along the optical axis, n is a refractive index of an element at a design wavelength λ.

Surface numbers 1 and 2 represent the cylindrical lens 12, a number 3 represents the reflection surface of the polygon mirror 14, numbers 4 and 5 represent the diffractive element 16, numbers 6 and 7 represent the first lens 21 of the fθ lens 20, numbers 8 and 9 represent the second lens 22, numbers 10 and 11 represent the compensation lens 30. The diffractive element 16 is arranged such that the normal Ax2 at the reference point A is inclined with respect to the optical axis Ax1 of the fθ lens 20 by 10 degrees in the direction that the light source side edge is close to the polygon mirror 14 and that the reference point A deviates from the optical axis Ax1 by 2.5 mm in the direction away from the semiconductor laser 10. That is, θ equals +10 degrees and S equals +2.5 mm.

TABLE 1 f = 200 mm　　W = 300 mm　　ω = 86.0 deg.　　λ = 780 nm

| Surface Number | ry | rz | d | n |
|---|---|---|---|---|
| 1 | ∞ | 50.000 | 4.000 | 1.51072 |
| 2 | ∞ | — | 94.500 | |
| 3 | ∞ | — | 15.000 | |
| 4 | −1403.950 | — | 2.000 | 1.48617 |
| 5 | 940.670 | — | 33.500 | |
| 6 | −175.567 | — | 7.000 | 1.48617 |
| 7 | −116.265 | — | 2.000 | |
| 8 | ∞ | — | 15.000 | 1.76591 |
| 9 | −212.490 | — | 115.000 | |
| 10 | −1712.510 | 29.348 | 5.000 | 1.48617 |
| 11 | −3498.000 | — | 79.500 | |

The incident side surface 16a (surface number 4) of the diffractive element 16, and the both surfaces (surface number 6 and 7) of the first lens 21 are rotationally symmetrical aspherical surfaces defined by the above equation (ii). However, h is a distance from the optical axis Ax1 for the surfaces of the first lens 21. The various constants and coefficients for defining these surfaces are shown in TABLE 2.

TABLE 2

| Surface Number | K | $A_4$ | $A_6$ | $A_8$ | $A_{10}$ |
|---|---|---|---|---|---|
| 4 | 0.00 | $-1.926 \times 10^{-6}$ | $1.463 \times 10^{-9}$ | 0.000 | 0.000 |
| 6 | 2.80 | $-7.488 \times 10^{-7}$ | $3.283 \times 10^{-10}$ | $-2.570 \times 10^{-15}$ | 0.000 |
| 7 | 0.80 | $-5.112 \times 10^{-7}$ | $1.319 \times 10^{-10}$ | $3.760 \times 10^{-14}$ | 0.000 |

It should be noted that the radii of curvature of the aspherical surfaces indicated in TABLE 1 are values on the reference point for the diffractive element and on the optical axis for the other elements.

The exit side surface 16b (surface number 5) of the diffractive element 16 is the diffractive surface that is formed by applying the diffractive structure on the rotationally symmetrical aspherical base curve. The various constants and coefficients for defining the diffractive structure and the base curve are shown in TABLE 3. The focal length of the diffractive structure at the design wavelength 780 nm is 1150.95 mm.

TABLE 3

| K | 0.000 | $P_2$ | $-5.56955 \times 10^{-1}$ |
|---|---|---|---|
| $A_4$ | $-1.118 \times 10^{-6}$ | $P_4$ | $-3.75526 \times 10^{-4}$ |
| $A_6$ | $-1.422 \times 10^{-9}$ | $P_6$ | $1.23060 \times 10^{-6}$ |
| $A_8$ | $2.538 \times 10^{-12}$ | $P_8$ | $-1.55919 \times 10^{-10}$ |
| $A_{10}$ | 0.000 | $P_{10}$ | $-1.53350 \times 10^{-12}$ |

The incident side surface (surface number 8) of the second lens 22 is a flat surface. The exit side surfaces (surface number 9 and 11) of the second lens 22 and the compensation lens 30 are spherical surfaces.

Furthermore, the incident side surface (surface number 10) of the compensation lens 30 is an anamorphic surface that does not have a rotation axis. The shape of the surface (surface number 10) in the main scanning plane is expressed by the non-circular arc curve expressed by the equation (vi).

$$X(Y) = \frac{Y^2}{r\left\{1 + \sqrt{1 - \frac{(K+1)^2 Y^2}{r^2}}\right\}} + \quad \text{(vi)}$$

$$A_4 Y^2 + A_6 Y^6 + A_8 Y^8 + A_{10} Y^{10}$$

A radius of curvature in the auxiliary scanning direction varies in accordance with the distance Y from the optical axis Ax1 in the main scanning direction. The radius of curvature rz(Y) of the surface in the auxiliary scanning direction at the point where the distance from the optical axis Ax1 is Y is expressed by the following equation (vii).

$$\frac{1}{rz(Y)} = \frac{1}{rz0} + B_1 Y + B_2 Y^2 + B_3 Y^3 + B_4 Y^4 + \quad \text{(vii)}$$

$$B_5 Y^5 + B_6 Y^6 + B_7 Y^7 + B_8 Y^8$$

The values $B_1$ through $B_8$ are coefficients that define the radius of curvature in the auxiliary scanning direction, rz0 is a radius of curvature in the auxiliary scanning direction on the optical axis Ax1. The coefficients that define the surface whose surface number is 10 are shown in TABLE 4.

TABLE 4

| ry | −1712.510 | rz0 | 29.348 |
|---|---|---|---|
| K | 0.000 | $B_1$ | $-1.894 \times 10^{-6}$ |
| $A_4$ | $1.264 \times 10^{-8}$ | $B_2$ | $-5.892 \times 10^{-7}$ |
| $A_6$ | $4.220 \times 10^{-13}$ | $B_3$ | 0.000 |
| $A_8$ | $-3.000 \times 10^{-17}$ | $B_4$ | $-1.114 \times 10^{-12}$ |
| $A_{10}$ | 0.000 | $B_5$ | 0.000 |
| — | — | $B_6$ | $1.250 \times 10^{-15}$ |
| — | — | $B_7$ | 0.000 |
| — | — | $B_8$ | $-3.484 \times 10^{-20}$ |

FIGS. 5A through 6B are graphs showing lateral chromatic aberration of the scanning optical system 100 at the various arrangements of the diffractive element 16. Each of these graph plots a deviation of a beam spot formed by a laser beam at wavelength 770 nm in the main scanning direction with reference to a beam spot formed by a laser beam at the design wavelength 780 nm. That is, the wavelength difference Δλ is −10 nm. The axis of ordinate of each graph represents an image height (height of scanning spot on the object surface 40 from a point where the optical axis Ax1 intersects the object surface 40), the axis of abscissa represents amount of the deviation of the beam spot, and the unit is millimeter for both axes. The image height is zero on the optical axis Az1, the side of the semiconductor laser 10 is represented by a minus value and the opposite side a plus value.

If the diffractive element 16 is not provided, the lateral chromatic aberration monotonously increases from a plus image height to a minus image height as shown in FIG. 5A. When the diffractive element 16 is arranged to be perpendicular to the optical axis Ax1 as shown in FIG. 4A, the lateral chromatic aberration is corrected as shown in FIG. 5B. However, this arrangement needs an additional cover glass and causes the problem of ghost light.

When the diffractive element 16 is inclined by 10 degrees in the clockwise direction to be as shown in FIG. 4B, the diffractive element 16 allows to pass both of the incident laser beam onto the polygon mirror 14 and the reflected laser beam from the polygon mirror 14. However, since the lateral chromatic aberration is overcorrected in the upper side of the optical axis Ax1 and is undercorrected in the lower side of the optical axis Ax1, the curve of the lateral chromatic aberration bends like a bow as shown in FIG. 5C. Under the condition, while the lateral chromatic aberration is zero on the optical axis, it becomes considerably large at the peripheries of the scanning range. A comparison of FIG. 5C with FIG. 5A shows that the lateral chromatic aberration is overcorrected in the plus image height and is undercorrected in the minus image height.

FIG. 6A shows the lateral chromatic aberration under the condition of FIG. 4C, i.e., the first embodiment. When the reference point A deviates from the optical axis by 2.5 mm, the value lateral chromatic aberration at each image height is averaged, which reduces the maximum value of the aberration in half. The first embodiment satisfies the condition (1).

FIG. 6B shows the lateral chromatic aberration under the condition of variation of the first embodiment. When the reference point A deviates from the optical axis by 5.0 mm, the lateral chromatic aberration becomes zero at the peripheries of the scanning range, which aligns the edges of the scanning range regardless of wavelength. This variation also satisfies the condition (1).

As described above, when the actual wavelength is shorter than the design wavelength ($\Delta\lambda<0$), the lateral chromatic aberration is indicated by the curve of downward slant to right as shown in FIG. 5A. The inclination of the diffractive element 16 in the clockwise direction ($\theta>0$) changes the curve of the lateral chromatic aberration as a bow whose peripheries are in the plus side. Then, the deviation of the diffractive element 16 in the direction away from the semiconductor laser 10 (S>0) shifts the curve to the minus side while keeping its form, which averages the variation of the lateral chromatic aberration.

Further, when the actual wavelength is longer than the design wavelength ($\Delta\lambda>0$), the lateral chromatic aberration is indicated by the curve of upward slant to right. The inclination of the diffractive element 16 in the clockwise direction ($\theta>0$) changes the curve of the lateral chromatic aberration as a bow whose peripheries are in the minus side. Then, the deviation of the diffractive element 16 in the direction away from the semiconductor laser 10 (S>0) shifts the curve to the plus side while keeping its form, which averages the variation of the lateral chromatic aberration.

On the other hand, when the diffractive element 16 is inclined in the counterclockwise direction ($\theta<0$), the relationship between the wavelength difference and the curve of the lateral chromatic aberration reverses relative to the above description, That is, when the actual wavelength is shorter than the design wavelength, the lateral chromatic aberration is represented as a bow whose peripheries are in the minus side, and when the wavelength is longer than the design wavelength, the lateral chromatic aberration is represented as a bow whose peripheries are in the plus side. Then the deviation of the diffractive element 16 in the direction nearer to the semiconductor laser 10 (S<0) shifts the curve to the plus side when $\Delta\lambda<0$, to the minus side when $\Delta\lambda>0$, respectively. This averages the variation of the lateral chromatic aberration.

Thus, the direction of the deviation of the diffractive element 16 is determined by the direction of the inclination thereof regardless of the sign (plus or minus) of the wavelength difference $\Delta\lambda$. The deviation amount S is determined in the range of the condition (1) or 2) based on an allowable wavelength difference and the correction effect of the diffractive element in the chromatic aberration or the like.

Second Embodiment

Figure 7:
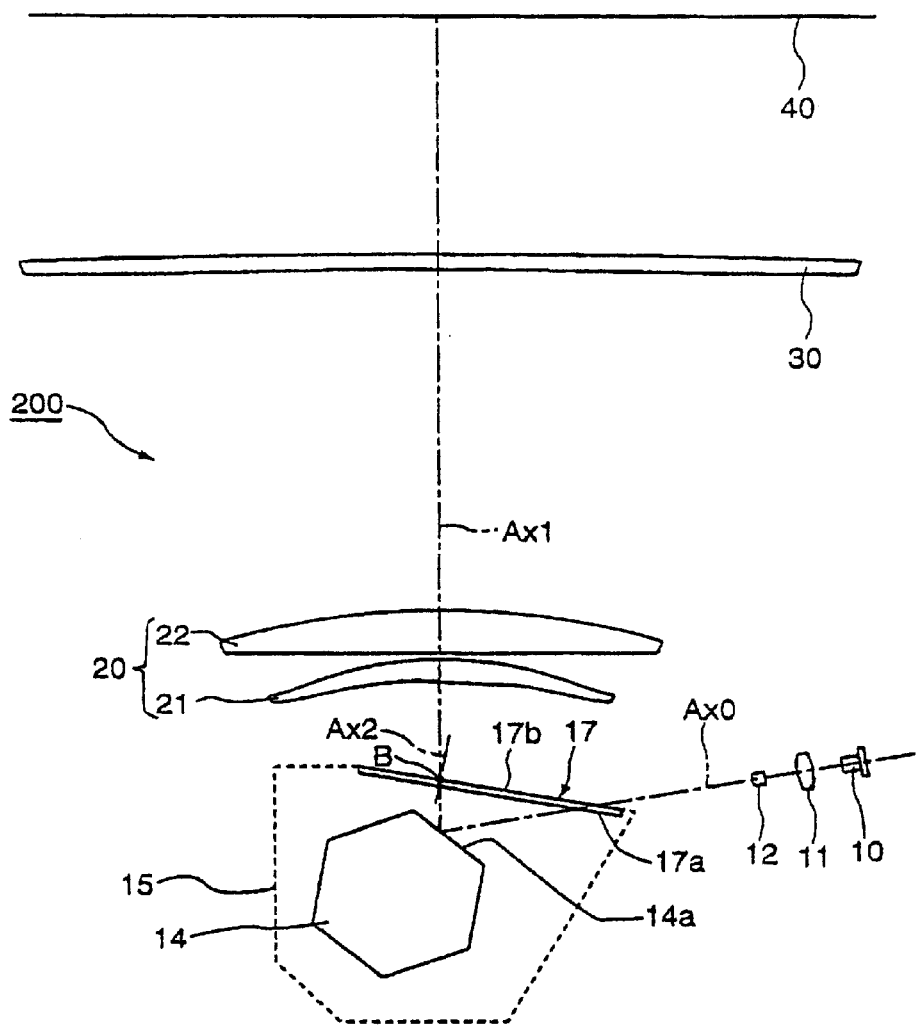
FIG. 7 is a diagram showing an arrangement of optical elements of a scanning optical system, viewed in the main scanning plane, according to a second embodiment.

FIG. 7 is a diagram illustrating a basic construction of a scanning optical system 200 according to the second embodiment, viewed in the main scanning plane.

The scanning optical system 200 of the second embodiment is provided with a diffractive element 17 instead of the diffractive element 16 of the first embodiment. That is the only difference. The other constructions are identical with that of the first embodiment.

The diffractive element 17 doubles as a cover glass of the noise reduction cover 15. A first surface 17a of the diffractive element 17 at the side of the polygon mirror 14 is a substantially flat surface and the diffractive surface is formed in a part of a second surface 17b at the side of the f$\theta$ lens 20. The diffractive surface is formed relative to an intersection point B with the optical axis of the f$\theta$ lens 20 as the center to correct chromatic aberration caused by the refractive power of the f$\theta$ lens 20.

The diffractive element 17 is arranged such that the normal Ax2 of the diffractive element 17 at the intersection point B is inclined with respect to the optical axis Ax1 of the f$\theta$ lens 20 in a clockwise direction in FIG. 7 relative to a reference condition where the normal Ax2 is parallel to the optical axis Ax1. With such an arrangement of the diffractive element 17, the diffractive element 17 allows to pass both of the incident laser beam onto the polygon mirror 14 and the reflected laser beam from the polygon mirror 14. It should be noted that the center of the diffractive element 17, which is equivalent to the reference point A of the first embodiment, does not deviate from the optical axis Ax1.

Figure 8:
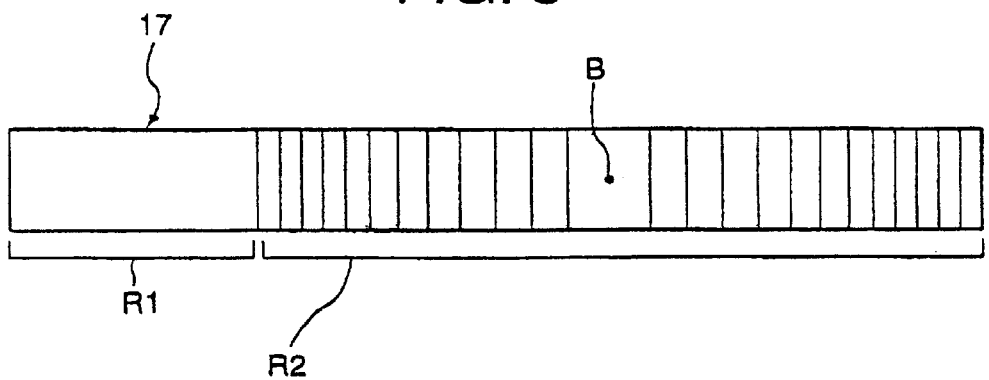
FIG. 8 is a front view of a diffractive element employed in the optical system of FIG. 7.

FIG. 8 is a front view of the diffractive element 17 viewed from the side of the f$\theta$ lens 20. The sectional shape of the diffractive element 17 is the same as shown in FIG. 3.

The diffractive element 17 is divided into a non-diffractive area R1 and a diffractive area R2, as shown in FIG. 8. The laser beam incident on the polygon mirror 14 passes through the non-diffractive area R1 and the laser beam reflected by the polygon mirror 14 passes through the diffractive area R2. The surface 17a is formed as a continuous surface without steps and is almost flat. The second surface 17b is formed as a flat surface within the non-diffractive area R1 and as the diffractive surface within the diffractive area R2.

The diffractive element 17 is formed such that the additional optical path length added by the diffractive surface asymmetrically varies with the distance from the optical axis Ax1 in the main scanning direction and that the additional optical path length has the minimum value on the intersection point B. In the second embodiment, the diffractive surface is formed as a plurality of rectangular areas as shown in FIG. 8, and minute steps are formed at the boundaries between the adjacent rectangular areas.

The boundaries between the adjacent rectangular areas are straight lines as shown in FIG. 8. That is, the additional optical path length varies only in the main scanning direction and does not vary in the auxiliary scanning direction.

The surface of each rectangular area is a flat surface that is perpendicular to the normal Ax2 at the intersection point B. The rectangular areas are formed like a staircase in the section. The rectangular area including the intersection point B is the thinnest area and the thickness increases step by step with the distance from the intersection point B. The diffractive surface is a concave modified toric surface in macroscopic view. Further, the diffractive element 17 has almost no power in proximity to the intersection point B.

The additional optical path length added by the diffractive surface is expressed by the optical path difference function $\Phi(h)$ that is defined by the following equation (viii);

$$(viii) \Phi(h) = P_1 Y + P_2 Y^2 + P_3 Y^3 + P_4 Y^4 + P_5 Y^5 + P_6 Y^6 + \ldots$$

where $P_n$ is a coefficient of n-th order, Y is a distance from the intersection point B in the main scanning direction and $\lambda$ is wavelength. The equation (viii) includes odd-order terms, which is difference from the equation (iii).

The following TABLES 5, 6 and 7 show the numerical construction of the diffractive element 17 of the second embodiment. The numerical constructions of the other elements are the same as TABLE 1. TABLE 5 shows radii of curvature ry, rz, a distance d between surfaces, and a refractive index n. TABLE 6 shows coefficient for defining the surface 17a (surface number 4). The surface 17b (surface number 5) is the diffractive surface that is formed by applying the diffractive structure on the modified toric base curve. The modified toric surface that is defined as a locus when the non-circular arc curve is rotated about a rotation axis that is perpendicular to the optical axis Ax1. Both of the non-circular arc and the rotation axis exist in the main scanning plane. The non-circular curve is defined by the equation (vi). TABLE 7 shows the coefficients for defining the non-circular curve of the base curve of the surface 17b and the coefficients for defining the diffractive structure. The diffractive element 17 is arranged such that the normal Ax2 at the intersection point B is inclined with respect to the optical axis Ax1 of the fθ lens 20 by 10 degrees in the direction that the light source side edge is close to the polygon mirror 14. That is, θ equals +10 degrees. The focal length of the diffractive structure at the design wavelength 780 nm is 1141.1 mm.

TABLE 5

| Surface Number | ry | rz | d | n |
|---|---|---|---|---|
| 4 | 2239.692 | — | 2.000 | 1.48617 |
| 5 | 431.771 | 55.101 | 33.500 | |

TABLE 6

| Surface Number | K | $A_4$ | $A_6$ | $A_8$ | $A_{10}$ |
|---|---|---|---|---|---|
| 4 | 0.00 | $-1.253 \times 10^{-5}$ | $8.254 \times 10^{-9}$ | $-2.565 \times 10^{-12}$ | 0.000 |

TABLE 7

| K | 0.000 | $P_1$ | 0.00000 |
|---|---|---|---|
| $A_4$ | $-1.081 \times 10^{-5}$ | $P_2$ | $-5.61745 \times 10^{-1}$ |
| $A_6$ | $7.333 \times 10^{-8}$ | $P_3$ | $6.48355 \times 10^{-3}$ |
| $A_8$ | $-2.697 \times 10^{-12}$ | $P_4$ | $-8.62532 \times 10^{-5}$ |
| $A_{10}$ | 0.000 | $P_5$ | $-4.40468 \times 10^{-6}$ |
| — | — | $P_6$ | 0.00000 |
| — | — | $P_7$ | 0.00000 |

Figure 9:
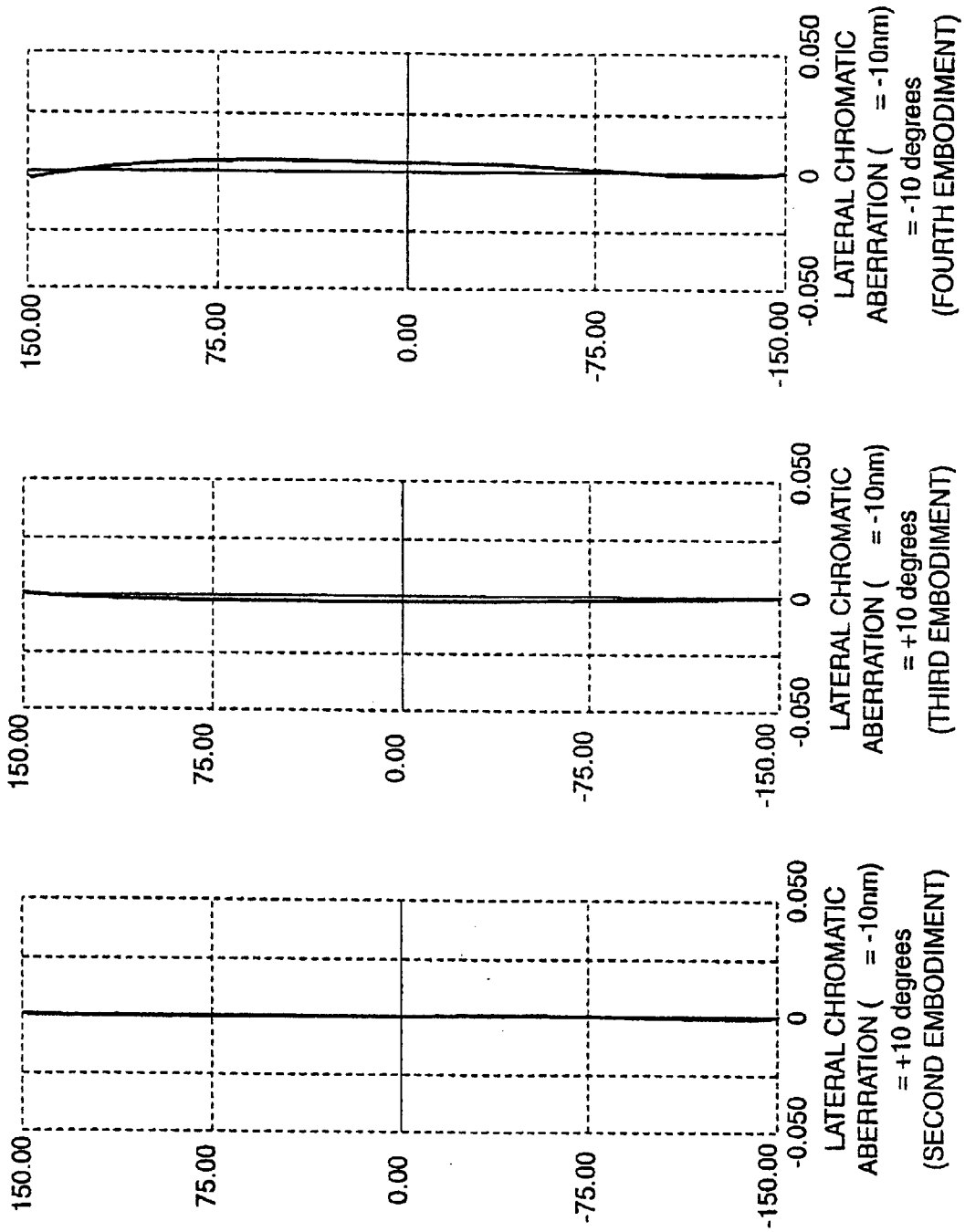
FIG. 9A is a graph showing lateral chromatic aberration of the scanning optical system according to the second embodiment.
FIG. 9B is a graph showing lateral chromatic aberration of the scanning optical system according to a third embodiment.
FIG. 9C is a graph showing lateral chromatic aberration of the scanning optical system according to a fourth embodiment.

FIG. 9A is a graph showing lateral chromatic aberration of the scanning optical system 200. Since the optical path difference function Φ(Y) contains the odd-order items, the variation of the additional optical path length becomes asymmetrical with respect to the optical axis Ax1, which counterbalances an asymmetry of the lateral chromatic aberration caused when the diffractive element 17 is inclined with respect to the optical axis Ax1, reducing the lateral chromatic aberration as shown in FIG. 9A.

In the second embodiment, since the diffractive element 17 is inclined such that the light source side edge thereof is close to the polygon mirror 14, the condition (3) is satisfied ($P_1=0 \geq 0$).

Third Embodiment

Next, the third embodiment will be described. Since the scanning optical system of the third embodiment is identical with that of the second embodiment except the construction of the diffractive element, the drawings that show the optical system of the third embodiment are omitted. That is, the difference between the second and third embodiments is not appeared in the drawings. The diffractive element according to the third embodiment is arranged such that the normal Ax2 at the intersection point B is inclined with respect to the optical axis Ax1 in the direction that the light source side edge of the diffractive element is close to the polygon mirror 14, and the additional optical path length added by the diffractive surface asymmetrically varies with the distance from the optical axis Ax1 in the main scanning direction.

The following TABLEs 8 and 9 show the numerical construction of the diffractive element of the third embodiment. TABLE 8 shows a radius of curvature ry (=rz) and coefficients for defining the surface at the side of the polygon mirror 14 (surface number 4). The surface at the side of the fθ lens 20 (surface number 5) is the diffractive surface that is formed by applying the diffractive structure on the modified toric base curve. TABLE 9 shows the coefficients for defining the non-circular curve of the base curve and the coefficients for defining the diffractive structure. The diffractive element is arranged such that the normal Ax2 at the intersection point B is inclined with respect to the optical axis Ax1 by 10 degrees (θ=+10 degrees). The focal length of the diffractive structure at the design wavelength 780 nm is 1133.0 mm.

TABLE 8

| ry | K | $A_4$ | $A_6$ | $A_8$ | $A_{10}$ |
|---|---|---|---|---|---|
| −201.558 | 0.00 | $-5.282 \times 10^{-6}$ | $-1.989 \times 10^{-9}$ | 0.000 | 0.000 |

TABLE 9

| ry | −329.695 | $P_1$ | 1.06190 |
|---|---|---|---|
| K | 0.000 | $P_2$ | $-5.65763 \times 10^{-1}$ |
| $A_4$ | $-4.422 \times 10^{-6}$ | $P_3$ | $2.54511 \times 10^{-3}$ |
| $A_6$ | $-9.038 \times 10^{-10}$ | $P_4$ | $-1.29832 \times 10^{-4}$ |
| $A_8$ | $1.904 \times 10^{-14}$ | $P_5$ | $1.37187 \times 10^{-6}$ |
| $A_{10}$ | 0.000 | $P_6$ | 0.00000 |
| rz | 29.836 | $P_7$ | 0.00000 |

FIG. 9B is a graph showing lateral chromatic aberration of the scanning optical system according to the third embodiment. The lateral chromatic aberration is reduced as with the second embodiment. In the third embodiment, since the diffractive element 17 is inclined such that the light source side edge thereof is close to the polygon mirror 14, the condition (3) is satisfied ($P_1=1.06190 \geq 0$).

Fourth Embodiment

Figure 10:
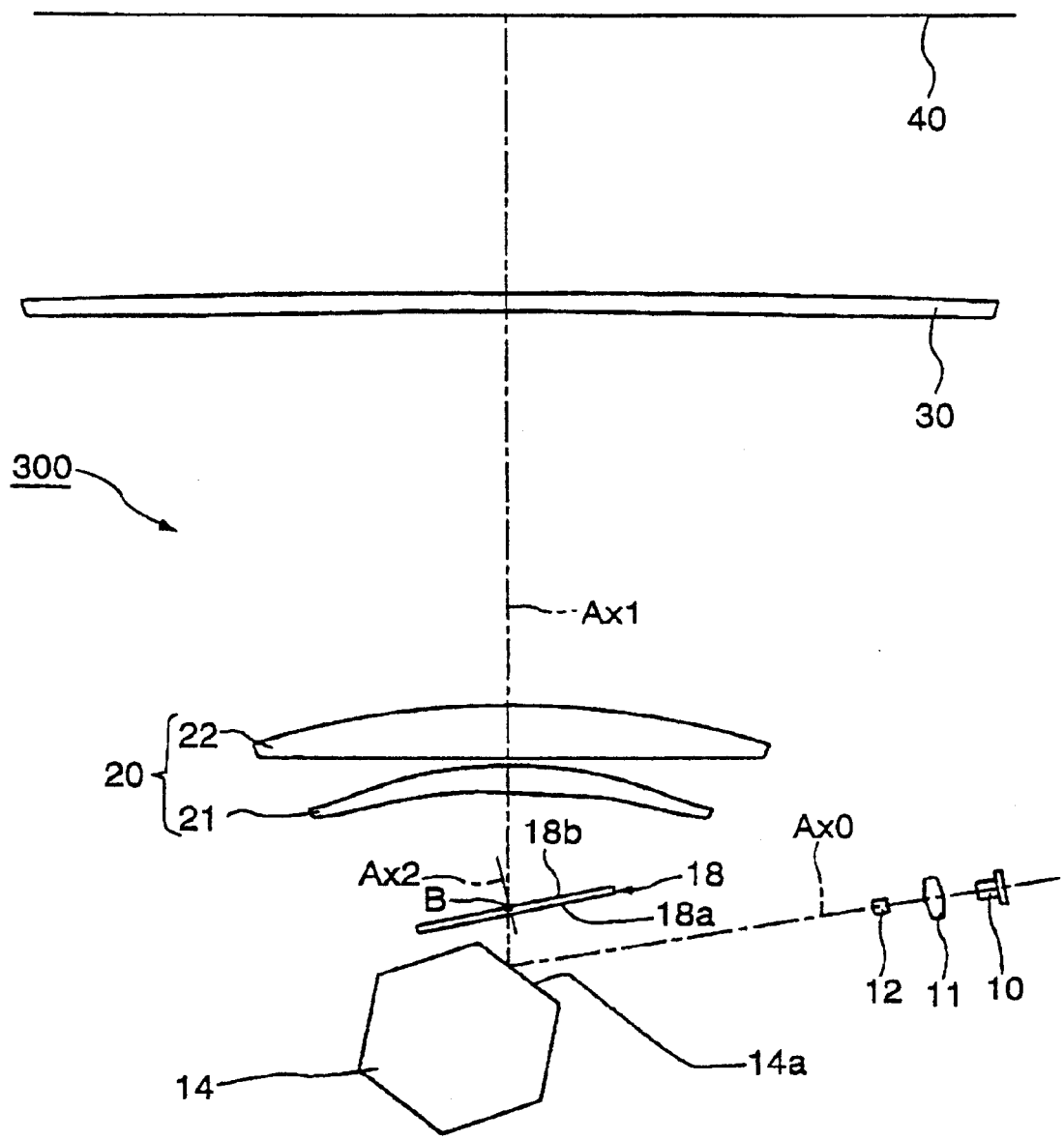
FIG. 10 is a diagram showing an arrangement of optical elements of a scanning optical system, viewed in the main scanning plane, according to the fourth embodiment.

FIG. 10 is a diagram illustrating a basic construction of a scanning optical system 300 according to the fourth embodiment, viewed in the main scanning plane.

The scanning optical system 300 of the fourth embodiment is provided with a diffractive element 18 instead of the diffractive element 17 of the second embodiment. The scanning optical system 300 of the fourth embodiment is identical with that of the second embodiment except the construction and arrangement of the diffractive element 18.

The diffractive element 18 according to the fourth embodiment is arranged such that the normal Ax2 at the intersection point B is inclined with respect to the optical axis Ax1 in the direction that the light source side edge of the diffractive element 18 is apart from the polygon mirror 14, and the additional optical path length added by the diffractive surface asymmetrically varies with the distance from the optical axis Ax1 in the main scanning direction.

The following TABLEs 10 to 11 show the numerical construction of the diffractive element 18 of the fourth embodiment. TABLE 10 shows a radius of curvature ry (=rz) and coefficient for defining the surface 18a at the side of the polygon mirror 14 (surface number 4). The surface 18b at the side of the fθ lens 20 (surface number 5) is the diffractive surface that is formed by applying the diffractive structure on the modified toric base curve. TABLE 11 shows the coefficients for defining the non-circular curve of the base curve and the coefficients for defining the diffractive structure. The diffractive element 18 is arranged such that the normal Ax2 at the intersection point B is inclined with respect to the optical axis Ax1 by −10 degrees (θ=−10 degrees). The focal length of the diffractive structure at the design wavelength 780 nm is 984.2 mm.

TABLE 10

| ry | K | $A_4$ | $A_6$ | $A_8$ | $A_{10}$ |
|---|---|---|---|---|---|
| 446.994 | 0.00 | $-1.361 \times 10^{-5}$ | $8.075 \times 10^{-9}$ | 0.000 | 0.000 |

TABLE 11

| ry | 228.816 | $P_1$ | −1.40693 |
|---|---|---|---|
| K | 0.000 | $P_2$ | $-6.51322 \times 10^{-1}$ |
| $A_4$ | $-1.205 \times 10^{-5}$ | $P_3$ | $6.87510 \times 10^{-3}$ |
| $A_6$ | $7.124 \times 10^{-8}$ | $P_4$ | $1.51555 \times 10^{-4}$ |
| $A_8$ | $-8.705 \times 10^{-13}$ | $P_5$ | $7.95142 \times 10^{-6}$ |
| $A_{10}$ | 0.000 | $P_6$ | 0.00000 |
| rz | 116.633 | $P_7$ | 0.00000 |

FIG. 9C is a graph showing lateral chromatic aberration of the scanning optical system 300 according to the fourth embodiment. The lateral chromatic aberration is reduced as with the second embodiment. In the fourth embodiment, since the diffractive element 18 is inclined such that the light source side edge thereof is apart from the polygon mirror 14, the condition (4) is satisfied ($P_1=-140693<$ ).

The present disclosure relates to subject matter contained in Japanese Patent Applications No. 2000-5448 filed on Jan. 14, 2000, and No. 2000-135454 filed on May 9, 2000, which are expressly incorporated herein by reference in their entireties.

What is claimed is:

1. A scanning optical system, comprising:
    a light source;
    a deflector, which deflects a beam emitted from said light source;
    a scanning lens having positive refractive power for converging the beam deflected by said deflector onto an object surface to be scanned; and
    a diffractive element, which is located between said deflector and said object surface, for correcting chromatic aberration caused by the refractive power of said scanning lens, said diffractive element employing a diffractive surface that is formed to be symmetrical with respect to a predetermined reference point in a main scanning direction along which the beam scans, wherein said diffractive element is arranged such that the normal of said diffractive surface at said reference point is inclined with respect to the optical axis of said scanning lens in the main scanning direction and that said reference point deviates from said optical axis in the main scanning direction.

2. The scanning optical system according to claim 1, wherein said diffractive element is a flat plate in a macroscopic view having almost no power in proximity to said reference point.

3. The scanning optical system according to claim 1, wherein said diffractive element is located between said deflector and said scanning lens.

4. The scanning optical system according to claim 3, wherein said diffractive element is inclined such that one edge of said diffractive element is close to said deflector and the other edge is apart from said deflector in the main scanning direction relative to a reference condition where the normal of said diffractive surface at said reference point is parallel to the optical axis of said scanning lens, and wherein said reference point deviates from said optical axis toward the edge that is apart from said deflector.

5. The scanning optical system according to claim 4, wherein the center axis of the laser beam incident on said deflector and the optical axis of said scanning lenses are located in a main scanning plane and cross each other at a predetermined angle, and wherein said diffractive element is arranged such that the light source side edge thereof is closer to said deflector relative to said reference condition and that said reference point deviates from said optical axis in the direction away from said light source.

6. The scanning optical system according to claim 5, wherein said diffractive element satisfies the following condition (1);

(1) $0<S<0.7\times|\theta|$ where S (unit: mm) is a deviation amount of the reference point with respect to the optical axis of said scanning lens and has a positive value when the reference point deviates in the direction away from said light source, θ (unit: degree) is an inclination angle of the normal of said diffractive surface with respect to the optical axis and has a positive value when said diffractive element is inclined such that the light source side edge thereof is close to said deflector.

7. The scanning optical system according to claim 4, wherein the center axis of the laser beam incident on said deflector and the optical axis of said scanning lends are located in a main scanning plane and cross each other at a predetermined angle, and wherein said diffractive element is arranged such that the light source side edge thereof is apart from said deflector and that said reference point deviates from said optical axis in the direction nearer to said light source.

8. The scanning system according to claim 7, wherein said diffractive element satisfies the following condition (2);

(2) $-0.7\times|\theta|<S<0$ where S (unit: mm) is a deviation amount of the reference point with respect to the optical axis of said scanning lens and has a positive value when the reference point deviates in the direction away from said light source, θ (unit: degree) is an inclination angle of the normal of said diffractive surface with respect to the optical axis and has a positive value when said diffractive element is inclined such that the light source side edge thereof is close to said deflector.

9. A scanning optical system, comprising:
    a light source;
    a deflector, which deflects a beam emitted from said light source;
    a scanning lens having positive refractive power for converging the beam deflected by said deflector onto an object surface to be scanned; and
    a diffractive element, which is located between said deflector and said object surface, having a diffractive surface to correct chromatic aberration caused by the refractive power of said scanning lens, said diffractive element being arranged such that the normal of said diffractive surface at an intersection point with the optical axis of said scanning lens is inclined with respect to said optical axis in a main scanning direction along which the beam scans, wherein an additional optical path length added by said diffractive surface asymmetrically varies with the distance from said optical axis in the main scanning direction and said additional optical path length has the minimum value at said intersection point.

10. The scanning optical system according to claim 9, wherein said diffractive element is a flat plate in a macroscopic view having almost no power in proximity to said intersection point.

11. The scanning optical system according to claim 9, wherein the center axis of the laser beam incident on said deflector and the optical axis of said scanning lens are located in a main scanning plane and cross each other at a predetermined angle.

12. The scanning optical system according to claim 11, wherein said diffractive element is inclined such that the light source side edge thereof is closer to said deflector relative to a reference condition where the normal of said diffractive surface at said intersection point is parallel to the optical axis of said scanning lens, and the following condition (3) is satisfied;

(3) $P_1 \geq 0$ when said additional optical path length added by said diffractive surface is expressed by the following optical path difference function $\Phi(Y)$:

$$\Phi(Y)=(P_1Y+p_2Y^2+P_3Y^3+P_4Y^4+P_5Y^5+P_6Y^6+\ldots)\times\lambda$$

where $P_n$ is a coefficients of n-th order, Y is a distance from the optical axis in the main scanning direction and $\lambda$ is wavelength.

13. The scanning optical system according to claim 11, wherein said diffractive element is inclined such that the light source side edge thereof is apart from said deflector, and the following condition (4) is satisfied;

(4) $P_1 < 0$ when said additional optical path length added by said diffractive surface is expressed by the following optical path difference function $\Phi(Y)$:

$$\Phi(Y)=(P_1Y+P_2Y^2+P_3Y^3+P_4Y^4+P_5Y^5+P_6Y^6+\ldots)\times\lambda$$

where $P_n$ is a coefficients of n-th order, Y is a height from the optical axis in the main scanning direction and $\lambda$ is wavelength.

14. The scanning optical system according to claim 9, wherein the macroscopic shape of said diffractive surface is an anamorphic surface whose rotation axis is parallel to the main scanning direction.

* * * * *